United States Patent
Stuiver et al.

(10) Patent No.: US 10,414,940 B2
(45) Date of Patent: Sep. 17, 2019

(54) FOAMED COATING COMPOSITION AND METHOD FOR COATING A SUBSTRATE WITH SUCH COATING COMPOSITION

(71) Applicant: Akzo Nobel Coatings International B.V., Arnhem (NL)

(72) Inventors: Anthonie Stuiver, Noorden (NL); Rebecca Krijt, Rijswijk (NL); Patrick Grosze Nipper, Zandvoort (NL)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/780,702

(22) PCT Filed: Dec. 7, 2016

(86) PCT No.: PCT/EP2016/079988
§ 371 (c)(1),
(2) Date: Jun. 1, 2018

(87) PCT Pub. No.: WO2017/097795
PCT Pub. Date: Jun. 15, 2017

(65) Prior Publication Data
US 2018/0355208 A1  Dec. 13, 2018

(30) Foreign Application Priority Data

Dec. 10, 2015 (EP) .................. 15199340

(51) Int. Cl.
| | |
|---|---|
| *C09D 133/08* | (2006.01) |
| *C09D 15/00* | (2006.01) |
| *C09D 7/43* | (2018.01) |
| *B05D 3/04* | (2006.01) |
| *B05D 7/08* | (2006.01) |

(52) U.S. Cl.
CPC ............. *C09D 133/08* (2013.01); *B05D 3/04* (2013.01); *B05D 7/08* (2013.01); *C09D 7/43* (2018.01); *C09D 15/00* (2013.01); *B05D 2203/20* (2013.01); *B05D 2502/00* (2013.01)

(58) Field of Classification Search
CPC ........ C09D 133/08; C09D 7/43; C09D 15/00; B05D 3/04; B05D 7/08; B05D 2203/20; B05D 2502/00
See application file for complete search history.

(56) References Cited

U.S. PATENT DOCUMENTS

| | | |
|---|---|---|
| 3,663,462 A | 5/1972 | Arndt et al. |
| 4,376,142 A | 3/1983 | Allen |
| 5,616,419 A | 4/1997 | Hsu et al. |
| 5,786,072 A | 7/1998 | Hsu et al. |
| 6,316,016 B1 | 11/2001 | Iwakawa |
| 6,528,114 B1 | 3/2003 | Summons |
| 2006/0076531 A1 | 4/2006 | Hagguist |

FOREIGN PATENT DOCUMENTS

| | | |
|---|---|---|
| CN | 1140105 A | 1/1997 |
| JP | 54-020075 A | 2/1979 |
| JP | 61-174272 A | 8/1986 |
| JP | 2014-132069 A | 7/2014 |

*Primary Examiner* — Robert S Walters, Jr.
(74) *Attorney, Agent, or Firm* — McDonnell Boehnen Hulbert & Berghoff LLP

(57) ABSTRACT

The invention relates to a method for coating a substrate comprising: a) providing a liquid aqueous coating composition, the composition comprising an acrylic resin as binder, one or more surfactants, a coalescence solvent, and a thickener; b) foaming the liquid aqueous coating composition to obtain a foamed coating composition; c) applying a layer of the foamed coating composition on the substrate; and d) allowing gas to escape from the layer of foamed coating composition and allowing the coating composition to dry to form a homogeneous non-foam dried coating, wherein the liquid aqueous coating composition provided in step a) comprises the acrylic resin in a concentration in the range of from 1 to 20 wt %, comprises the thickener in a concentration in the range of from 0.05 to 2.0 wt %, and has a solids content of at most 25 wt %, based on the total weight of the liquid aqueous coating composition. The invention further relates to foamed aqueous coating composition obtainable by steps a) and b).

19 Claims, No Drawings

2

FOAMED COATING COMPOSITION AND METHOD FOR COATING A SUBSTRATE WITH SUCH COATING COMPOSITION

This application is the US national phase under 35 U.S.C. § 371 of international application PCT/EP2016/079988, filed Dec. 7, 2016, which claims priority to European application 15199340.9, filed Dec. 10, 2015.

FIELD OF THE INVENTION

The present invention relates to a method for coating a substrate, in particular a wooden substrate, with a foamed coating composition and to a foamed coating composition.

BACKGROUND OF THE INVENTION

Exterior wood substrates such as furniture, sheds, fences and other garden woods, are often surface-coated with weatherproofing coating compositions in order to prevent or delay weathering and to improve appearance. Aqueous coating compositions with acrylic resins as binder are often used for such coatings. Such acrylic resin based coating compositions typically have a low concentration of resin, usually less than 20 wt %, often less than 10 wt % or even less than 5 wt %, based on the total weight of the coating composition. The total solids content of such coating compositions is also relatively low, often below 25 wt % or even 15 wt %. As a result of the low resin and solids concentration, the viscosity of such coating compositions is relatively low. Thickeners are generally used to maintain can stability, i.e. to keep any inorganic particulate ingredients such as pigments and extenders, in suspension. The viscosity of such low resin, low solids coating compositions, also with thickeners, is usually below 0.5 Pa·s, often below 0.2 Pa·s or even below 0.1 Pa·s (as measured according to ISO 3219 at 23° C. and 100 $s^{-1}$ shear rate).

Aqueous coating compositions are typically applied to substrates as a liquid by brush or by roller or as an aerosol by spray. For low viscosity coating compositions, brush or roller application typically results in dripping of the coating composition from the applicator (brush or roller) or from the substrate. Spray coating easily results in overspray.

It is known to apply aqueous coating compositions as a foam, in particular for coating compositions with a high solids content.

In U.S. Pat. No. 4,376,142 for example is disclosed foam application of a prime coating for fiberboard. An aqueous coating composition comprising clay, polyvinyl acetate latex, and a foaming agent is foamed and applied as a prime coat and then heated to have the foam collapsed and the coating dried. The latex coating compositions of U.S. Pat. No. 4,376,142 have very high solids content: typically 3 to 5 parts by weight of latex and 49 to 61 parts by weight of clay.

In U.S. Pat. No. 6,528,114 is disclosed a method for applying a substantially water and weather proof coating to a recessed surface (i.e. formed by cracks, cuts, holes and the like) of a wooden object by applying a foamed coating composition to the recessed surfaces. The foam subsequently collapses into a fluid that penetrates and seals the contacted wood surface. The coating compositions of U.S. Pat. No. 6,528,114 may be solvent-based or water-based. As suitable water-based coating composition is mentioned a coating composition comprising 35-45 wt % modified alkyd resin.

In JP2014132069 is disclosed a method for smoothly and uniformly coating wood surfaces by applying an aqueous coating composition as a foam. The aqueous coating composition of JP2014132069 is a composition with a relatively high solids content. It comprises 20-70 wt % solids of a synthetic resin or a natural oil or fat, a thixotropic agent, and 3 to 10 wt % of a lubricant such as for example polyethylene-based spherical particles, silicone powder, polymer powders or waxes. The coating composition may further comprise color pigments (up to 20 wt %) and 10-70 wt % of an inorganic extender. Exemplified coating compositions have solid contents in the range of from 50 to 70 wt %, and are either alkyd-resin based coatings or acrylic resin based plaster type coating compositions with high amounts of inorganic extenders.

For aqueous coating compositions with low solid content such as are typically used for decorating and weatherproofing exterior wood surfaces such as sheds, fences and other garden woods, there is a need for a more convenient way of application, also for the non-experienced painter, that results in a dried coating of acceptable appearance.

SUMMARY OF THE INVENTION

It has now been found that aqueous decorative coating compositions based on acrylic resins with a relatively low resin concentration and a relatively low solids content, can be applied as a foam on a substrate. By carefully choosing the amount of resin, solids, and thickener in such coating composition, a foam can be obtained that is sufficiently stable to be conveniently applied. The foam can be applied on a vertically extending surface without showing unacceptable sagging and dripping of the wet coating layer. Moreover, a homogeneous non-foam dried coating is obtained with an acceptable appearance and without visible gas bubbles.

Accordingly, in a first aspect the invention relates to a method for coating a substrate comprising:
  a) providing a liquid aqueous coating composition, the composition comprising an acrylic resin as binder, one or more surfactants, a coalescence solvent, and a thickener;
  b) foaming the liquid aqueous coating composition to obtain a foamed coating composition;
  c) applying a layer of the foamed coating composition on the substrate; and
  d) allowing gas to escape from the layer of foamed coating composition and allowing the coating composition to dry to form a homogeneous non-foam dried coating, wherein the liquid aqueous coating composition provided in step a) comprises the acrylic resin in a concentration in the range of from 1 to 20 wt %, comprises the thickener in a concentration in the range of from 0.05 to 2.0 wt %, and has a solids content of at most 25 wt %, based on the total weight of the liquid aqueous coating composition.

In a second aspect, the invention relates to a foamed aqueous coating composition obtainable as hereinbefore specified in steps a) and b).

DETAILED DESCRIPTION OF THE INVENTION

The method according to the invention is a method for coating a substrate comprising: a) providing a liquid aqueous coating composition; b) foaming such liquid coating composition to obtain a foamed coating composition; and c) applying a layer of the foamed coating composition on the substrate.

The liquid aqueous coating composition provided in step a) comprises an acrylic resin as binder, one or more surfactants, a coalescence solvent, and a thickener.

The liquid aqueous coating composition may be a clear or an opaque coating composition. It may be colored or uncolored coating composition. It may for example be a paint, a wood stain, or a varnish. Preferably, the liquid coating composition is a wood stain. It has been found that the method according to the invention is particularly advantageous if the liquid coating composition is a wood stain and the foamed stain is applied in step c) as a single foam layer on a wooden substrate. The method then results in a dried coating with good appearance and acceptable color strength.

Reference herein to an acrylic resin is to a film-forming acrylic polymer. Such polymer is obtained from monoethylenically unsaturated monomers, typically by emulsion polymerization. There are three groups of acrylic polymers known colloquially as "acrylics", "vinyls" or "styrenics". The "acrylics" are usually copolymers of at least two alkyl esters of one or more mono-ethylenically unsaturated carboxylic acids, e.g. methyl methacrylate/butyl acrylate copolymer, whilst the "vinyls" usually comprise copolymers of a mono-vinyl ester of a saturated carboxylic acid, such as vinyl acetate, and at least one of either an acrylic monomer or a different mono-vinyl ester, often the vinyl ester of a carboxylic acid containing 10 to 12 carbon atoms. The "styrenics" are copolymers containing styrene, or a similar mono-vinyl aromatic monomer, together with a co-polymerizable monomer which is usually an acrylic.

The liquid coating composition may comprise any acrylic resin known to be suitable as film-forming resin in coating compositions.

The liquid aqueous coating composition comprises the acrylic resin in a concentration in the range of from 1 to 20 wt %, based on the total weight of the liquid coating composition, preferably of from 2 to 15 wt %, more preferably of from 3 to 12 wt %. A concentration of acrylic resin the range of from 4 to 8 wt % is particularly preferred since it combines sufficient coating formation with reduced risk of blockage of filters or orifices during foaming step b).

The liquid coating composition comprises one or more surfactants that act as a foaming agent, so that a sufficiently stable foam can be formed in step b). Any amphophilic compounds known to reduce the surface tension of water may be used as surfactant, including anionic, cationic and non-ionic surfactants. Examples of suitable surfactants include, but are not limited to, sulphates, ethoxylates, phosphates, phosphonates and amines, such as fatty acid amide ethoxylates, alkyl ethoxylates, alkyl phenol ethoxylates, ethoxylated phosphated alcohols or amines. The one or more surfactants may be present in the liquid aqueous coating composition as such, i.e. by adding surfactant(s) as a separate ingredient during manufacture of the liquid coating composition provided in step a), or may be present in the aqueous coating composition as part of one or more other ingredients such as an emulsion of acrylic resin or a pigment dispersion. The liquid coating composition may comprise the one or more surfactants in any suitable amounts, preferably in the range of from 0.01 to 10 wt %, more preferably of from 0.02 to 5 wt %, even more preferably of from 0.05 to 2 wt % based on the total weight of the liquid coating composition.

Preferably, the liquid coating composition is substantially free of compounds that are known to act as defoaming agents, such as for example insoluble oils, polydimethylsiloxanes and other silicones. Reference herein to 'substantially free of' is to a concentration of less than 0.01 wt %, preferably less than 0.005 wt %. It will be appreciated that minor amounts of defoaming agent may be introduced in the liquid coating composition with the other ingredients of the liquid coating composition, such as a resin emulsion or a pigment paste, typically in an amount below 0.01 wt %, preferably below 0.005 wt %.

The liquid coating composition provided in step a) comprises a coalescence solvent. It has been found that the incorporation of a coalescence solvent in the liquid coating composition results in a more stable foam and in a more even distribution of air voids in the foam compared to foams prepared from liquid coating compositions without a coalescence solvent. Any coalescence solvent suitable for use in aqueous coating compositions comprising an acrylic resin as a binder may be used. Such coalescence solvents are well known in the art and commercially available. Suitable coalescence solvents include glycol ethers, mixtures of glycol ethers and alcohols, dibasic esters, ester alcohols. Examples of suitable commercially available coalescence solvents include Lusolvan™ FBH (di-isobutyl ester of a mixture of dicarboxylic acids), Lusolvan™ PP (di-isobutyl ester of a mixture of dicarboxylic acids), Loxanol™ EFC 300 (linearic ester), Buty Carbitol™, Butyl Cellosolve, Dowanol™ EPh (ethylene glycol phenyl ether), Dowanol™ PPh (propylene glycol phenyl ether), Dowanol™ TPnB (tripropylene glycol n-butyl ether), Dowanol™ DPnB, DBE-9™ (a mixture of refined dimethyl gluterate and dimethyl succinate), Eastman DB™ solvent, Eastman EB™ (ethylene glycol monobutyl ether), Texanol™ (2,2,4-trimethyl-1,3-pentanediol monoisobutyrate), Dapro™ FX 511, Velate™ 262, Arcosolve™ DPNB, Arcosolve™ TPnB.

The liquid coating composition preferably comprises the coalescence solvent in an amount in the range of from 0.1 to 3.0 wt %, more preferably of from 0.2 to 1.0 wt %, based on the total weight of the liquid coating composition.

The coating composition may further comprise any suitable dyes or color pigments, inorganic extenders, and additives such as biocides, and leveling agents. The amount of high density inorganic solids such as inorganic white or color pigments and inorganic extenders such as calcium carbonate, chalk or clays is preferably limited. Preferably, the concentration of inorganic solids in the coating composition, typically the inorganic color pigments and inorganic extenders, is at most 10 wt %, more preferably at most 5 wt %, based on the total weight of the liquid coating composition. A high amount of such high density solids would result in a relatively high density of the liquid coating composition and therewith to a foamed coating composition that is prone to so-called "sagging" if applied to a vertical surface, i.e. running down the surface before the coating has had time to dry enough to lose fluidity. Preferably, the liquid coating composition has a density of at most 1.2 kg/liter.

The total solids content, typically the sum of resin and inorganic solids, of the liquid coating composition is below 25 wt %, preferably below 20 wt %, even more preferably below 15 wt %, based on the total weight of the liquid coating composition. For wood stains, the solids content of the coating composition is preferably in the range of from 6 to 12 wt %. Preferably, the coating composition comprises at least 75 wt % water, more preferably at least 80 wt % water. It has been found that the high water content of the liquid coating composition results in improved appearance of the dried coating. It is believed that due to the relatively high amount of water to be evaporated during drying of the coating, foam cells have collapsed before a completely dried coating is obtained and a non-foam dried coating is obtained.

Because of its low solids content, the viscosity of the liquid coating composition provided in step a), i.e. the non-foamed coating composition, is typically low. The liquid coating composition comprises a thickener. Such thickener provides can stability of the liquid coating composition, i.e. avoids sedimentation of particulate solids such as pigments or extenders in the can. It has been found that by carefully controlling the amount and type of thickener, a foam is obtained that is on the one hand sufficiently stable to avoid dripping of liquid from foam applied to a vertically extending surface and on the other hand not too stable. A too stable foam may lead to unacceptable sagging of the foam if applied on a vertically extending surface. The liquid coating composition comprises in the range of from 0.05 to 2.0 wt % of thickener, preferably in the range of from 0.1 to 1.5 wt %, more preferably of from 0.2 to 1.0 wt %. An amount of thickener in the range of from 0.3 to 0.8 wt % is particularly preferred since it results in a foam that can be applied on vertically extending smooth surfaces, without sagging or dripping.

The thickener may be any thickener known to be used in coating compositions such as paints and wood stains. Such thickeners include rheology modifying clays, and non-associative and associative organic thickeners.

Non-associative thickeners are water-soluble (or at least water-swellable) polymers which increase viscosity mainly by overlap and/or entanglement of their polymer chains and/or by their occupation of large volumes of space within the coating composition. These effects are promoted by the molecular weight, stiffness and straightness of their polymer chains. Associative thickeners are also water-soluble (or at least water-swellable) polymers. They have chemically-attached hydrophobic groups that are capable of self-association into micellar-like assemblies as well as non-specific adsorption onto all colloidal surfaces present. This behaviour is similar to that of conventional surfactants. It results in a transient network of polymer chains which increase the Brookfield viscosity of coating compositions. Examples of non-associative organic thickeners are the long, medium or short chain cellulose ethers known as "cellulosics" which comprise straight and stiff polymeric backbones making cellulosics exceptionally effective in increasing the viscosity of aqueous systems. Examples of cellulosics include hydroxyethyl cellulose, methyl cellulose, hydroxypropylmethyl cellulose and ethylhydroxyethyl cellulose.

Associative thickeners have found extensive commercial use in aqueous coating compositions. Different types can be distinguished. A first type is the hydrophobically modified alkali soluble emulsion or "HASE" type. Commercial examples of HASE type thickeners have hydrophilic backbones comprising salts of polymerised or copolymerised unsaturated carboxylic acids or acid anhydrides such as acrylic or methacrylic acids or maleic anhydride. Hydrophilic moieties such as polyalkylene glycols (e.g. polyethylene glycol) are attached to the hydrophilic backbones and hydrophobic groups are in turn are attached to the hydrophilic moieties. In use, solutions of these HASE type thickeners are added as free-flowing liquids to a coating composition at neutral or slightly acidic pH. An increase in Brookfield viscosity is then caused by raising the pH to mildly alkaline conditions whereupon carboxylate anions are formed.

A second type of associative thickener is the hydrophobically modified hydroxy alkyl (especially ethyl) cellulosic or "HMHEC" type conveniently made by the addition of long chain alkyl epoxides to hydroxyalkyl celluloses of the type used as non-associative thickeners.

A third type of associative thickener is the block/condensation copolymer "HEUR" type (hydrophobically modified ethoxylate urethane thickeners) comprising hydrophilic blocks and hydrophobic blocks usually terminating in hydrophobic groups. The hydrophilic blocks may be provided by polyalkylene oxide (especially polyethylene oxide) moieties of relatively low molecular weight of say below 10,000 Da, preferably 3,400 to 8,000 Da. The hydrophilic blocks are condensed with for example hydrophobic urethane-forming di-isocyanates such as toluene di-isocyanate.

A fourth type of associative thickener is the hydrophobically modified polyacrylamide type in which the hydrophobic groups are incorporated as free radical copolymers with N-alkyl acrylamides. These are most useful in acidic coating compositions.

A fifth type of associative thickener does exist that is a hydrophobically modified ethoxylate urethane alkali-swellable emulsion or "HEURASE" type. This type combines the functionality of the HASE and HEUR types.

The liquid coating composition preferably comprises an associative thickener. More preferably, the thickener is an associative thickener of the HASE type, HEUR type or HEURASE type, or a combination of two or more thereof.

The viscosity of the liquid coating composition is preferably in the range of from 0.003 to 0.3 Pa·s, more preferably of from 0.005 to 0.2 Pa·s, even more preferably of from 0.01 to 0.1 Pa·s. Without wishing to be bound to any theory, it is believed that by controlling the resin concentration, solids content and amount and type of thickener such that the liquid coating composition has a viscosity in the defined ranges, even more preferably in the range of from 0.01 to 0.05 Pa·s, a foam is obtained that is particularly suitable for application on vertically extending surfaces and yields a dried coating of good appearance. Reference herein to viscosity is to the viscosity as determined according to ISO 3219 at 23° C. and a shear rate of 100 s$^{-1}$.

In a particularly preferred embodiment of the invention, the liquid coating composition is a wood stain with a resin content in the range of from 4 to 8 wt %, a solids content in the range of from 6 to 12 wt %, a concentration of thickener in the range of from 0.2 to 1.0 wt %, wherein the thickener is an associative thickener. All concentrations are based on the total weight of the liquid coating composition.

In step b) of the method of the invention, the liquid coating composition provided in step a) is foamed to obtain a foamed coating composition. This may be done in any suitable way, for example by blowing air or another suitable gas through the liquid coating composition. Meshes or other means with orifices may be used to finely disperse gas through the liquid composition. Propellants may be used to create the foam. Preferably the foaming in step b) comprises expanding the volume of the aqueous liquid coating composition to a volume in the range of from 2 to 50 times the volume of the liquid coating composition provided in step a), more preferably 4 to 25 times.

In step c), a layer of the foamed coating composition is applied on a substrate. Subsequently, gas is allowed to escape from the foamed layer and the coating composition is allowed to dry so that a homogeneous non-foam dried coating is formed. It has been found that gas easily escapes from a coating composition comprising acrylic resin, thickener, total solids in the ranges specified. Gas will escape before a dried coating is obtained by evaporation of water and coalescence of the acrylic binder polymer. Thus, a homogeneous non-foam dried coating is obtained. Reference herein to a homogeneous dried coating is to a dried coating without visible gas bubbles. It will be appreciated that, in order to allow gas to escape from the layer of the foamed coating composition before a dried coating is formed, the coating composition should not comprise compounds that form a fixated foam structure such as reactive hardening agents, like for example isocyanates. Such reactive hardening agents form a hardened polymer structure upon reacting with another compound, such as for the reaction of isocyanate with a polyhydroxide compound.

Preferably, the coating composition is substantially free of any binder polymer or precursor of binder polymer other than the acrylic resin. Reference herein to a composition substantially free of a compound is to a composition comprising less than 1 wt %, preferably less than 0.5 wt %, more preferably less than 0.1 wt % of such compound, based on the total weight of the liquid coating composition.

The terms resin and binder polymer are used herein interchangeably.

The method according to the invention is particularly suitably for coating a vertically extending substrate. By applying the coating as a foam, a low viscosity coating compositions can be applied on a vertically extending substrate whilst avoiding dripping of the coating composition.

The substrate may be of any suitable material, such as a wood, paper, plaster, concrete, polymeric, or metal substrate. The substrate may have a smooth or a rough surface. Preferably, the substrate is a wooden substrate.

The invention further relates to a foamed aqueous coating composition obtainable by steps a) and b) as hereinbefore described.

Examples

The invention is further illustrated by means of the following, non-limiting examples.

Preparation of Liquid Wood Stains

The following ingredients were used in preparing liquid wood stains.

Primal AC337

An emulsified acrylic resin ("acrylic") based on methyl methacrylate, butyl methacrylate and 2-ethylhexylacrylate monomers.

Acrylic resin no. 2

An emulsified acrylic resin ("vinylic") based on vinyl acetate, butyl acrylate and acrylic acid monomers.

Texanol™

An ester alcohol coalescence solvent (2,2,4-trimethyl-1,3-pentanediol monoisobutyrate).

Timbasol® oxide red

A wood colorant with iron oxide ($Fe_2O_3$) as color pigment (C.I. pigment red 101): pigment dispersion with 65% pigment and 3.75 wt % anionic surfactant.

Acrysol™ TT-615: HASE thickener

Acrysol™ RM-12W: HEUR thickener

Six different liquid aqueous wood stains were prepared by mixing an emulsion of an acrylic resin with coalescence solvent, thickener, pigment paste that includes a surfactant, and water. The pH was adjusted to 8.0-8.5 using an ammonia solution. Table 1 gives the composition of the six liquid wood stains prepared (all ingredients in wt % based on total weight of the liquid wood stain). The weight percentage of the acrylic resin is given as the wt % of the solid resin based on the total weight of the liquid wood stain.

Preparation of Foams

Foams were prepared from the different liquid wood stains. The foams were prepared by pumping liquid wood stain (30 grams/minute) and air (1.5 L/minute) through a tube (diameter of 0.5 cm) and discharging the resulting liquid/air mixture from the tube through two meshes placed at a distance of 1.5 cm from each other (first through a mesh with an opening width of 160 µm; then through a mesh with an opening with of 70 µm).

The foam-liquid ratio (volume of the foam compared to the volume of the liquid coating composition) and the foam stability were determined (the percentage foam reduction in 5 minutes and the percentage of liquid drained from the foam in 5 minutes).

Application of Foam Layer on Wood Substrate

The foams thus obtained were applied on vertically extending wood surfaces (pine) using a film applicator with an adjustable gap so that a wet layer of a given thickness can be applied. For all foams, wet layers of a thickness of 1000 µm, 2000 µm and 3000 µm were applied, both on a rough (sawed) and on a smooth (planed) pine wood surface. The coatings were allowed to dry at room temperature. The appearance of the dried coatings was determined by visual inspection at 24 hours after application. The extent of sagging and dripping of the wet coating layer was determined by visual inspection.

Results

Table 1 shows the viscosity of the liquid wood stains, the foam characteristics of the foams prepared from the different wood stains, the sagging and dripping behavior of wet foam layers applied on vertically extending rough and smooth wood surfaces, and the appearance of the dried coatings.

For wet foam layers of foams prepared with wood stains with 4 wt % resin, the foam disappeared within 30 minutes after application. For the foam prepared with wood stain with 12 wt % resin (wood stain 1), the foam disappeared within 2 hours after application.

The results in Table 1 show that foams are obtained that can be applied without sagging and dripping at vertically extending surfaces.

TABLE 1

Wood stain compositions, foam and coating characteristics of foams and coatings prepared from such wood stains.

| | | 1 | 2 | 3 | 4 | 5 | 6 |
|---|---|---|---|---|---|---|---|
| | Ingredient (wt %) | | | | | | |
| Acrylic resin | Primal AC337 | 12 | | | | | |
| Acrylic resin | Acrylic resin no. 2 | | 4 | 4 | 4 | 4 | 4 |
| HASE thickener | Acrysol TT-615 | 0.5 | 0.6 | 1.0 | | | 0.5 |
| HEUR thickener | Acrysol RM-12W | | | | 0.75 | 1.5 | |
| Coalescence solvent | Texanol | 0.5 | 0.5 | 0.5 | 0.5 | 0.5 | — |
| Pigment dispersion | Timbasol oxide red | 3.5 | 3.5 | 3.5 | 3.5 | 3.5 | 3.5 |
| Viscosity$^a$ (cP) | | 26 | 18 | 156 | <10 | 16 | |

TABLE 1-continued

Wood stain compositions, foam and coating characteristics of foams and coatings prepared from such wood stains.

|  | 1 | 2 | 3 | 4 | 5 | 6 |
|---|---|---|---|---|---|---|
| Foam and coating characteristics | | | | | | |
| Foam/Liquid ratio | 13 | 13 | 4 | 23 | 16 | [b] |
| Foam reduction (% v/v) | 28 | 54 | 0 | 50 | 23 | |
| Liquid drained (% v/v) | 46 | 94 | 0 | 83 | 72 | |
| Sag on smooth surface[c] | no sag | 3000 μm | <1000 μm | no sag | 3000 μm | |
| Drip on smooth surface[c] | 3000 μm | 1000 μm | <1000 μm | 2000 μm | 1000 μm | |
| Appearance on smooth surface | + up to 1000 μm − from 2000 μm | + | + | + | + | |
| Sag on rough surface[c] | no sag | 3000 μm | 3000 μm | no sag | no sag | |
| Drip on rough surface[c] | no drip | 2000 μm | 2000 μm | no drip | no drip | |
| Appearance on rough surface | − | + | + | + | + | |

[a]Brookfield viscosity determined at 23° C. with spindle no. 2 at a speed of 100 rpm
[b]No processable foam was obtained.
[c]Wet layer thickness (in μm) at which sagging or dripping started to occur. If no sagging or dripping was observed at a wet layer thickness of 3000 μm before the foam had disappeared, this is indicated as 'no sag' or 'no drip'.
Appearance:
+ even appearance, no dried bubbles;
− uneven appearance; dried bubbles

The invention claimed is:

1. A method for coating a substrate comprising:
   a) providing a aqueous liquid coating composition, the composition comprising an acrylic resin as binder, one or more surfactants, a coalescence solvent, and a thickener;
   b) foaming the aqueous liquid coating composition to obtain a foamed coating composition;
   c) applying a layer of the foamed coating composition on the substrate; and
   d) allowing gas to escape from the layer of foamed coating composition and allowing the foamed coating composition to dry to form a homogeneous non-foam dried coating,
   wherein the aqueous liquid coating composition provided in a) comprises the acrylic resin in a concentration in the range of from 1 to 20 wt %, comprises the thickener in a concentration in the range of from 0.05 to 2.0 wt %, and has a solids content of at most 25 wt %, based on the total weight of the aqueous liquid coating composition and wherein the aqueous liquid coating composition provided in a) is a paint, wood stain or varnish.

2. The method according to claim 1, wherein the aqueous liquid coating composition comprises the acrylic resin in a concentration in the range of from 2 to 15 wt % based on the total weight of the aqueous liquid coating composition.

3. The method according to claim 1, wherein the aqueous liquid coating composition comprises inorganic solids in a concentration of at most 10 wt %, based on the total weight of the aqueous liquid coating composition.

4. The method according to claim 1, wherein the aqueous liquid coating composition comprises at least 75 wt % water.

5. The method according to claim 1, wherein the thickener is an associative thickener.

6. The method according to claim 5, wherein the thickener is an associative thickener selected from the group consisting of HEUR (hydrophobically modified ethoxylate urethane) type thickeners, HASE (hydrophobically modified alkali soluble emulsion) type thickeners, HEURASE (hydrophobically modified ethoxylate urethane alkali-swellable emulsion) type thickeners, and combinations thereof.

7. The method according to claim 1, wherein the aqueous liquid coating composition comprises in the range of from 0.1 to 1.5 wt % of the thickener, based on the total weight of the aqueous liquid coating composition.

8. The method according to claim 1, wherein the aqueous liquid coating composition is substantially free of any binder polymer or precursor of binder polymer other than the acrylic resin.

9. The method according to claim 1, wherein the aqueous liquid coating composition is a wood stain.

10. The method according to claim 1, wherein the foaming comprises expanding the volume of the aqueous liquid coating composition to a volume in the range of from 2 to 50 times the volume of the aqueous liquid coating composition provided in a).

11. The method according to claim 1, wherein the substrate is a substantially vertically extending substrate.

12. The method according to claim 1, wherein the substrate is a wooden substrate.

13. The method according to claim 1, wherein the aqueous liquid coating composition comprises the acrylic resin in a concentration in the range of from 3 to 12 wt % based on the total weight of the aqueous liquid coating composition.

14. The method according to claim 1, wherein the aqueous liquid coating composition comprises the acrylic resin in a concentration in the range of from 4 to 8 wt % based on the total weight of the aqueous liquid coating composition.

15. The method according to claim 1, wherein the aqueous liquid coating composition comprises inorganic solids in a concentration of at most 5 wt %, based on the total weight of the aqueous liquid coating composition.

16. The method according to claim 1, wherein the aqueous liquid coating composition comprises at least 80 wt % water.

17. The method according to claim 1, wherein the aqueous liquid coating composition comprises in the range of from 0.2 to 1.0 wt % thickener based on the total weight of the aqueous liquid coating composition.

18. The method according to claim 1, wherein the aqueous liquid coating composition comprises in the range of from 0.3 to 0.8 wt % thickener based on the total weight of the aqueous liquid coating composition.

19. The method according to claim 1, wherein the foaming comprises expanding the volume of the aqueous liquid coating composition to a volume in the range of from 4 to 25 times the volume of the aqueous liquid coating composition provided in a).

* * * * *